United States Patent
Asprion et al.

(10) Patent No.: US 8,034,166 B2
(45) Date of Patent: Oct. 11, 2011

(54) CARBON DIOXIDE ABSORBENT REQUIRING LESS REGENERATION ENERGY

(75) Inventors: Norbert Asprion, Ludwigshafen (DE); Iven Clausen, Mannheim (DE); Ute Lichtfers, Karlsruhe (DE); Rupert Wagner, Worms (DE)

(73) Assignee: BASF SE, Ludwigshafen (DE)

( * ) Notice: Subject to any disclaimer, the term of this patent is extended or adjusted under 35 U.S.C. 154(b) by 274 days.

(21) Appl. No.: 12/301,390

(22) PCT Filed: May 11, 2007

(86) PCT No.: PCT/EP2007/054600
§ 371 (c)(1), (2), (4) Date: Nov. 18, 2008

(87) PCT Pub. No.: WO2007/134994
PCT Pub. Date: Nov. 29, 2007

(65) Prior Publication Data
US 2009/0199713 A1  Aug. 13, 2009

(30) Foreign Application Priority Data

May 18, 2006 (EP) ..................................... 06114183
Sep. 14, 2006 (EP) ..................................... 06120708

(51) Int. Cl.
*B01D 53/14* (2006.01)
*B01D 53/62* (2006.01)
(52) U.S. Cl. ............................ 95/236; 423/228; 252/184
(58) Field of Classification Search .................... 95/149, 95/156, 187, 191–193, 203, 235, 236; 423/226, 423/228, 229; 252/184
See application file for complete search history.

(56) References Cited

U.S. PATENT DOCUMENTS

| | | | |
|---|---|---|---|
| 4,073,863 A | 2/1978 | Giammarco et al. | |
| 4,094,957 A | 6/1978 | Sartori et al. | |
| 4,217,238 A * | 8/1980 | Sartori et al. | 252/192 |
| 4,278,646 A | 7/1981 | Lynn et al. | |
| 4,292,196 A | 9/1981 | Homeier et al. | |
| 4,376,102 A * | 3/1983 | Thaler et al. | 423/223 |
| 4,400,368 A | 8/1983 | Diaz | |
| 4,405,586 A * | 9/1983 | Sartori et al. | 423/233 |
| 4,405,811 A | 9/1983 | Stogryn et al. | |
| 5,348,714 A | 9/1994 | Peytavy et al. | |

(Continued)

FOREIGN PATENT DOCUMENTS

DE  4201921  7/1992

(Continued)

OTHER PUBLICATIONS

Dan G. Chapel et al., "Recovery of $CO_2$ from Flue Gases: Commercial Trends," (presented at the annual meeting of the Canadian Society of Chemical Engineers, Oct. 4-6, 1999, Saskatoon, Saskatchewan, Canada).

(Continued)

*Primary Examiner* — Frank M Lawrence
(74) *Attorney, Agent, or Firm* — Connolly Bove Lodge & Hutz LLP

(57) ABSTRACT

A description is given of an absorption medium for removing carbon dioxide from a gas stream, which comprises an aqueous solution of at least one amine and at least one aminocarboxylic acid and/or aminosulfonic acid. The concomitant use of an aminocarboxylic acid or aminosulfonic acid reduces the energy required for regeneration of the absorption medium.

19 Claims, 2 Drawing Sheets

U.S. PATENT DOCUMENTS

| | | | |
|---|---|---|---|
| 5,373,048 A | 12/1994 | Witzeman et al. | |
| 5,744,110 A * | 4/1998 | Mimura et al. | 423/226 |
| 5,749,941 A | 5/1998 | Jansen et al. | |
| 6,267,939 B1 | 7/2001 | Gemes et al. | |
| 6,500,397 B1 * | 12/2002 | Yoshida et al. | 423/228 |
| 6,939,393 B2 | 9/2005 | Asprion | |
| 7,887,620 B2 | 2/2011 | Asprion et al. | |
| 7,927,403 B2 | 4/2011 | Versteeg et al. | |
| 2004/0036055 A1 | 2/2004 | Asprion et al. | |
| 2005/0202967 A1 | 9/2005 | Hoefer et al. | |
| 2006/0117954 A1 * | 6/2006 | Versteeg et al. | 95/236 |
| 2008/0025893 A1 | 1/2008 | Asprion et al. | |
| 2008/0098892 A1 | 5/2008 | Asprion et al. | |
| 2008/0236390 A1 | 10/2008 | Anders et al. | |
| 2009/0199713 A1 | 8/2009 | Asprion et al. | |
| 2009/0211447 A1 | 8/2009 | Lichtfers et al. | |
| 2010/0186590 A1 * | 7/2010 | Vorberg et al. | 95/165 |
| 2010/0236408 A1 | 9/2010 | Asprion et al. | |

FOREIGN PATENT DOCUMENTS

| | | |
|---|---|---|
| DE | 102004011427 | 9/2005 |
| EP | 0331788 | 9/1989 |
| EP | 0368422 | 5/1990 |
| EP | 279 667 | 9/1995 |
| EP | 0671200 | 9/1995 |
| EP | 0 768 365 | 4/1997 |
| EP | 1062999 | 12/2000 |
| EP | 1582250 | 10/2005 |
| GB | 786669 | 11/1957 |
| GB | 1543748 | 4/1979 |
| JP | 05-301024 | 11/1993 |
| JP | 08252430 | 1/1996 |
| JP | 10-500612 | 1/1998 |
| JP | 2005-524526 | 8/2005 |
| WO | WO 02/07862 | 1/2002 |
| WO | WO 02/09849 | 2/2002 |
| WO | WO 2004/082809 | 9/2004 |
| WO | WO 2005/044955 | 5/2005 |
| WO | WO 2005/087350 | 9/2005 |
| WO | WO-2005087349 | 9/2005 |
| WO | WO 2006/022885 | 3/2006 |
| WO | WO 2007/045679 | 4/2007 |
| WO | WO 2007/104800 | 9/2007 |

OTHER PUBLICATIONS

Chen, C. C., Evans, L.B., A Local Composition Model for the Excess Gibbs Energy of Aqueous Electrolyte Solutions, AIChE J., 1986, 32(3), 444-454.

* cited by examiner

CARBON DIOXIDE ABSORBENT REQUIRING LESS REGENERATION ENERGY

CROSS REFERENCE TO RELATED APPLICATIONS

This application is a 35 U.S.C. 371 National Stage Application of International Application No. PCT/EP2007/054600, filed May 11, 2007, claiming priority from European Application No. 06114183.4, filed May 18, 2006 and European Patent Application No. 06120708.0, filed Sep. 14, 2006, the entire contents of which are incorporated herein by reference in their entireties.

The present invention relates to an absorption medium and a process for removing carbon dioxide from gas streams.

The removal of acid gases such as, for example, $CO_2$, $H_2S$, $SO_2$, $CS_2$, HCN, COS or mercaptans, from fluid streams, such as natural gas, refinery gas, synthesis gas, is important for differing reasons. Carbon dioxide, for example, must be removed from natural gas, since a high concentration of $CO_2$ reduces the calorific value of the gas. Furthermore, $CO_2$, in combination with moisture which is frequently entrained in the fluid streams, can lead to corrosion on lines and fittings. The sulfur compound content of natural gas must be reduced by suitable treatment measures directly at the natural gas source, since the sulfur compounds also form, in the water frequently entrained by the natural gas, acids which are corrosive. For transporting the natural gas in a pipeline, therefore preset limiting values of the sulfurous impurities must be complied with. Furthermore, numerous sulfur compounds, even at low concentrations, are foul smelling and, especially sulfur dioxide, toxic.

Removing carbon dioxide from flue gases is desirable for various reasons, but in particular for reducing the emission of carbon dioxide which is considered the main cause of what is termed the greenhouse effect.

On an industrial scale, for removing acid gases, such as carbon dioxide, from fluid streams, use is frequently made of aqueous solutions of organic bases, for example alkanolamines, as absorption media. On dissolving acid gases, in this case ionic products form from the base and the acid gas components. The absorption medium can be regenerated by heating, expansion to a lower pressure, or stripping, wherein the ionic products react back to form acid gases and/or the acid gases are stripped off by means of steam. After the regeneration process the absorption medium can be reused.

Flue gases have very low carbon dioxide partial pressures, since they generally result at a pressure close to atmospheric pressure and typically comprise 3 to 13% by volume carbon dioxide. To achieve effective removal of carbon dioxide, the absorption medium must have a high acid gas affinity, which generally means that the carbon dioxide absorption proceeds highly exothermally. On the other hand, the high absorption reaction enthalpy causes an increased energy consumption during regeneration of the absorption medium.

Dan G. Chapel et al. therefore advise in their paper "Recovery of $CO_2$ from Flue Gases: Commercial Trends" (presented at the annual meeting of the Canadian Society of Chemical Engineers, 4-6 Oct., 1999, Saskatoon, Saskatchewan, Canada), selecting an absorption medium having a relatively low reaction enthalpy for minimizing the required regeneration energy.

Minimizing the regeneration energy required is also desirable in other gas scrubbing applications.

GB 1 543 748 describes a process for removing $CO_2$ and $H_2S$ from a cracked gas using an aqueous solution of an alkali metal salt of an N-dialkyl-α-aminomonocarboxylic acid, such as dimethylglycine.

U.S. Pat. No. 4,094,957 discloses the removal of $CO_2$ from gas streams using an absorption solution which comprises a basic alkali metal salt, a sterically hindered amine and an amino acid such as N,N-dimethylglycine.

EP-A 671 200 describes the removal of $CO_2$ from combustion gases at atmospheric pressure using an aqueous solution of an amino acid metal salt and piperazine.

The object of the invention is to specify a process which permits substantial removal of carbon dioxide from fluid streams and in which regeneration of the absorption medium is possible with comparatively low energy consumption.

The object is achieved by an absorption medium which comprises an aqueous solution
(A) of at least one amine and
(B) at least one aminocarboxylic acid and/or aminosulfonic acid.

Generally, the absorption medium comprises, based on the weight of the absorption medium,
(A) 10 to 65% by weight, preferably 20 to 40% by weight, of an amine or a combination of amines and
(B) 1 to 40% by weight, preferably 10 to 30% by weight, of at least one aminocarboxylic acid and/or aminosulfonic acid.

The invention also relates to a process for removing carbon dioxide from a fluid stream, such as a gas stream, which comprises bringing the fluid stream into contact with the above defined absorption medium.

In a preferred embodiment of the process, the partial pressure of the carbon dioxide in the gas stream is less than 200 mbar, usually 20 to 150 mbar.

Generally, the total pressure (absolute pressure) in the absorption step is 1 to 120 bar. In a preferred embodiment of the process, the total pressure in the absorption step is at least 5 bar, particularly preferably 10 to 100 bar.

The aminocarboxylic acid and/or aminosulfonic acid is present in the aqueous solution in free form (i.e. zwitterionic form) or as ammonium salt of the amine (A). The aqueous solution essentially comprises no metal salt of the aminocarboxylic acid or aminosulfonic acid.

The aqueous solution is essentially free from inorganic basic salts, that is to say it preferably comprises less than about 10% by weight, in particular less than about 5% by weight, of inorganic basic salts. Inorganic basic salts are, for example, alkali metal carbonates or hydrogen carbonates, or alkaline earth metal carbonates or hydrogen carbonates, such as, in particular, potassium carbonate (potash).

The reduction of the regeneration energy by concomitant use of an aminocarboxylic acid or aminosulfonic acid is thought to be based on the following connections: amino acids are amphoteric compounds. Their acid strength (expressed by the $pK_a$ value) is temperature-dependent, the amino acids being more strongly acidic at higher temperatures than at lower temperatures. Since regeneration of the absorption medium customarily takes place at higher temperature than the $CO_2$ absorption, the strongly acid character of the amino acid supports the $CO_2$ release from the loaded absorption medium, as a result of which the energy requirement needed for regeneration is reduced. At lower temperatures, the amino acids behave in an Neutral manner or only slightly acid, so that the absorption capacity at lower temperatures is not affected, or is affected only slightly.

Aminocarboxylic acids comprise at least one amino group and at least one carboxyl group in their molecular structure. Correspondingly, aminosulfonic acids comprise at least one amino group and at least one sulfonic acid group in their molecular structure. The nitrogen atom of the amino group can be unsubstituted or monosubstituted or disubstituted, for example by $C_1$-$C_4$-alkyl or hydroxy-$C_2$-$C_4$-alkyl groups. Suitable aminocarboxylic acids customarily comprise 2 to 12 carbon atoms, for example 4 to 12 carbon atoms; suitable aminosulfonic acids, 1 to 6 carbon atoms.

Suitable aminocarboxylic acids are, for example

α-amino acids, such as glycine (aminoacetic acid), N-methylglycine (N-methylamino-acetic acid, sarcosine), N,N-dimethylglycine (dimethylaminoacetic acid), N-ethylglycine, N,N-diethylglycine, N,N-bis(2-hydroxyethyl) glycine (BICINE), alanine (2-aminopropionic acid), N-methylalanine (2-(methylamino)propionic acid), N,N-dimethylalanine, N-ethylalanine, 2-methylalanine (2-aminoisobutyric acid), leucine (2-amino-4-methylpentan-1-oic acid), N-methylleucine, N,N-dimethylleucine, isoleucine (2-amino-3-methylpentanoic acid), N-methylisoleucine, N,N-dimethylisoleucine, valine (2-aminoisovaleric acid), α-methylvaline (2-amino-2-methylisovaleric acid), N-methylvaline (2-methylaminoisovaleric acid), N,N-dimethylvaline, proline (pyrrolidine-2-carboxylic acid), N-methylproline, serine (2-amino-3-hydroxypropan-1-oic acid), N-methylserine, N,N-dimethylserine, 2-(methylamino)isobutyric acid, piperidine-2-carboxylic acid, N-methylpiperidine-2-carboxylic acid, β-amino acids, such as 3-aminopropionic acid (β-alanine), 3-methylaminopropionic acid, 3-dimethylaminopropionic acid, iminodipropionic acid, N-methyliminodipropionic acid, piperidine-3-carboxylic acid, N-methylpiperidine-3-carboxylic acid, or aminocarboxylic acids such as piperidine-4-carboxylic acid, N-methylpiperidine-4-carboxylic acid, 4-aminobutyric acid, 4-methylaminobutyric acid, 4-dimethyl-aminobutyric acid, 6-aminohexanoic acid.

Suitable aminosulfonic acids are, for example, aminomethanesulfonic acid, taurine (2-aminoethanesulfonic acid), N-methyltaurine (2-(methylamino)ethanesulfonic acid).

When the aminocarboxylic acid or the aminosulfonic acid has one or more chiral carbon atoms, the configuration is of no account; either the pure enantiomers/diastereomers or any desired mixtures or racemates can be used.

The aminocarboxylic acid is preferably an α-amino acid or a β-amino acid. The aminosulfonic acid is preferably an α-aminosulfonic acid or a β-aminosulfonic acid. Of these, particular preference is given to α-amino acid and β-aminosulfonic acid. The designation "α" or "β" means, in agreement with the customary nomenclature, that the amino group is separated from the carboxylic or sulfonic acid group by one or two carbon atoms, respectively.

Those which are particularly suitable are N-mono-$C_1$-$C_4$-alkylaminocarboxylic acids and N,N-di-$C_1$-$C_4$-alkylaminocarboxylic acids, in particular N-mono-$C_1$-$C_4$-alkyl-α-aminocarboxylic acids and N,N-di-$C_1$-$C_4$-alkyl-α-aminocarboxylic acids. These include, for example, N,N-dimethylglycine or N-methylalanine.

Particularly suitable α-amino acids, in addition, are those in which the α-carbon atom carries only substituents which are different from hydrogen, such as, for example, 2-aminoisobutyric acid.

As amine (A), suitable amines are all amines or combination of amines which are customarily used for removing acid gases from fluid streams. Suitable amines are distinguished generally by a boiling point at atmospheric pressure (1.013 bar absolute pressure) of at least 120° C. Preferably, the amines (A) have a vapor pressure at 20° C. of no more than 0.02 bar absolute. They are generally saturated compounds which in addition to one or more nitrogen atoms and hydrocarbon radicals comprise one or more oxygen atoms in the form of hydroxyl groups and/or in an ether bond.

The suitable amines (A) include, in particular:

alkanolamines (amino alcohols) such as 2-aminoethanol (monoethanolamine, MEA), N,N-bis(2-hydroxyethyl)amine (diethanolamine, DEA), N,N-bis(2-hydroxypropyl)amine (diisopropanolamine, DIPA), tris(2-hydroxyethyl)amine (triethanolamine, TEA), tributanolamine, bis(2-hydroxyethyl)-methylamine (methyldiethanolamine, MDEA), 2-diethylaminoethanol (diethylethanolamine, DEEA), 2-dimethylaminoethanol (dimethylethanolamine, DMEA), 3-dimethylamino-1-propanol (N,N-dimethylpropanolamine), 3-diethylamino-1-propanol, 2-diisopropylaminoethanol (DIEA), N,N-bis(2-hydroxypropyl)methylamine (methyldiisopropanolamine, MDIPA), 2-arhino-2-methyl-1-propanol (AMP), 1-amino-2-methyl-propan-2-ol, 2-amino-1-butanol (2-AB);

aminoethers such as 2-(2-aminoethoxy)ethanol (AEE), 2-(2-tert-butylaminoethoxy)ethanol (EETB), 3-methoxypropyldimethylamine; bistertiary diamines such as N,N,N',N'-tetramethylethylenediamine, 1N,N-diethyl-N',N'-dimethylethylenediamine, N,N,N',N'-tetraethylethylenediamine, N,N,N,N'-tetramethylpropanediamine (TMPDA), N,N,N',N'-tetraethylpropanediamine (TEPDA), N,N-dimethyl-N',N'-diethylethylenediamine (DMDEEDA), 1-dimethylamino-2-dimethylaminoethoxyethane (bis[2-(dimethylamino)ethyl]ether);

cycloaliphatic amines such as cyclohexylmethyldimethylamine;

and mixtures thereof.

The use of triethanolamine alone as amine (A) is not preferred.

In a preferred embodiment of the present invention, the absorption medium comprises at least one amine (A) which is selected from A1) tertiary amines such as, for example, tertiary amines of the general formulae

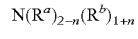

$N(R^a)_{2-n}(R^b)_{1+n}$ or

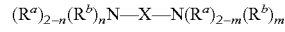

$(R^a)_{2-n}(R^b)_n N-X-N(R^a)_{2-m}(R^b)_m$ where $R^a$ is an alkyl group, $R^b$ is a hydroxyalkyl group, X is an alkylene group which if appropriate is singly or multiply interrupted by oxygen, and n and m are in each case an integer from 0 to 2. $R^a$ is, for example, an alkyl group having 1 to 10 carbon atoms ($C_1$-$C_{10}$-alkyl), preferably 1 to 6 carbon atoms ($C_1$-$C_6$-alkyl), and especially having 1 to 4 carbon atoms ($C_1$-$C_4$-alkyl). $R^b$ is a hydroxyalkyl group having, for example, 2 to 10 carbon atoms (hydroxy-$C_2$-$C_{10}$-alkyl), preferably hydroxy-$C_2$-$C_6$-alkyl, and especially hydroxy-$C_2$-$C_4$-alkyl. X is an alkylene group having, for example, 1 to 10, preferably 2 to 6, and especially 2, 3 or 4 carbon atoms which, if appropriate, is singly or multiply interrupted, for example two or three times, by oxygen.

Particularly preferably, the tertiary amine is selected from tris(2-hydroxyethyl)amine (triethanolamine, TEA), tris (2-hydroxypropyl)amine (triisopropanol), tributanolamine, bis(2-hydroxyethyl)methylamine (methyldiethanolamine, MDEA), 2-diethylaminoethanol (diethylethanolamine, DEEA), 2-dimethylaminoethanol (dimethylethanolamine, DMEA), 3-dimethylamino-1-propanol, 3-diethylamino-1-propanol, 2-diisopropylamino-ethanol (DIEA), N,N-bis(2-hydroxypropyl)methylamine (methyldiisopropanolamine, MDIPA), N,N,N',N'-tetramethylethylenediamine, N,N-diethyl-N', N'-dimethylethylenediamine, N,N,N',N'-tetraethylethylenediamine, N,N,N',N'-tetramethylpropanediamine (TMPDA), NNN',N'-tetra-ethylpropanediamine (TEPDA), N,N-dimethyl-N',N'-diethylethylenediamine (DMDEEDA) and 2-(2-dimethylaminoethoxy)-N,N-dimethylethanamine (bis[2-(dimethylamino)ethyl] ether);
and A2) sterically hindered amines, selected from
(i) amines having a primary amino group which is bound to a tertiary carbon atom, such as 2-amino-2-methyl-1-propanol (AMP)
(ii) amines having a secondary amino group which is bound to a secondary or tertiary carbon atom, and
(iii) amines in which a tertiary or quaternary carbon atom is arranged in P position to the amino group, such as 1-amino-2-methylpropan-2-ol.

In addition to the tertiary and/or sterically hindered amine, the absorption medium preferably comprises at least one activator. The activator is customarily a primary or secondary amine and accelerates the carbon dioxide uptake by intermediate formation of a carbamate structure. The activator is preferably selected from C1) 5-, 6- or 7-membered saturated heterocycles having at least one NH group in the ring, which can comprise in the ring one or two further heteroatoms selected from nitrogen and oxygen,
such as piperazine, 2-methylpiperazine, N-methylpiperazine, N-ethylpiperazine, N-aminoethylpiperazine, homopiperazine, piperidine and morpholine, C2) primary or secondary alkanolamines,
such as 2-aminoethanol (monoethanolamine, MEA), N,N-bis(2-hydroxy-ethyl)amine (diethanolamine, DEA), N,N-bis(2-hydroxypropyl)amine (diisopropanolamine, DIPA), 2-(methylamino)ethanol, 2-(ethylamino)ethanol, 2-(n-butylamino)ethanol, 2-amino-1-butanol (2-AB), 3-amino-1-propanol and 5-amino-1-pentanol, C3) alkylenediamines of the formula

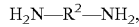
$H_2N-R^2-NH_2$, where $R^2$ is $C_2$-$C_6$-alkylene,
such as hexamethylenediamine, 1,4-diaminobutane, 1,3-diaminopropane, 2,2-dimethyl-1,3-diaminopropane, alkylenediamines of the formula

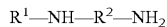
$R^1-NH-R^2-NH_2$ where $R^1$ is $C_1$-$C_6$-alkyl and $R^2$ is $C_2$-$C_6$-alkylene,
such as 3-methylaminopropylamine,

$(R^1)_2N-R^2-NH_2$ where $R^1$ is $C_1$-$C_6$-alkyl and $R^2$ is $C_2$-$C_6$-alkylene,
3-(dimethylamino)propylamine (DMAPA) and 3-(diethylamino)propylamine, C4) polyalkylenepolyamines
such as diethylenetriamine, triethylenetetramine and tetraethylenepentamine.

Examples of preferred activators are piperazine, 2-methylpiperazine, N-methyl-piperazine, homopiperazine, piperidine and morpholine, and also 3-methyl-aminopropylamine.

Further suitable activators are tris(3-aminopropyl)amine, tris(2-aminoethyl)amine, 2-(2-aminoethoxy)ethanol, N-(2-hydroxyethyl)ethylenediamine and N,N'-bis(2-hydroxyethyl)ethylenediamine.

Generally, the weight ratio of the amine (A) selected from amines A1) and A2) to the activator is 1:1 to 50:1, preferably 1:1 to 25:1.

When, as component (B), use is made of N-unsubstituted aminocarboxylic acids, N-monosubstituted aminocarboxylic acids such as, for example, N-mono-$C_1$-$C_4$-alkylaminocarboxylic acids, N-unsubstituted aminosulfonic acids and/or N-monosubstituted aminosulfonic acids, on account of their primary or secondary amino function, these can themselves act as activator and the concomitant use of a separate activator can then be dispensed with. Examples of N-unsubstituted aminocarboxylic acids are 2-aminoacetic acid (glycine), 2-aminopropionic acid (alanine), 2-aminoisobutyric acid (2-methylglycine), 2-amino-3-methylbutyric acid (valine), 2-amino-4-methylpentanoic acid (leucine), 2-amino-3-methylpentanoic acid (isoleucine), β-aminobutyric acid, 3-aminopropionic acid (β-alanine) and 2-amino-4-methylsulfanylbutanoic acid (methionine). Examples of N-monosubstituted aminocarboxylic acids are N-methylalanine, N-methylglycine (sarcosine), piperidine-4-carboxylic acid (isonipecotinic acid), piperidine-3-carboxylic acid (nipecontinic acid), piperidine-2-carboxylic acid (pipecolinic acid) and N-methylaminoisobutyric acid. Examples of preferred N-unsubstituted aminosulfonic acids and N-monosubstituted aminosulfonic acids are 2-aminoethanesulfonic acid (taurine) and also 2-(methylamino)ethanesulfonic acid (methyltaurine).

In a further preferred embodiment of the present invention, the absorption medium comprises at least one amine (A), which is selected from A'1) 5-, 6- or 7-membered saturated heterocycles having at least one NH group in the ring which can comprise in the ring one or two further heteroatoms selected from nitrogen and oxygen,
piperazine, 2-methylpiperazine, N-methylpiperazine, N-ethylpiperazine, N-aminoethylpiperazine, homopiperazine, piperidine and morpholine, A'2) primary or secondary alkanolamines,
such as 2-aminoethanol (monoethanolamine, MEA), N,N-bis(2-hydroxyethyl)amine (diethanolamine, DEA), N,N-bis(2-hydroxypropyl)amine (diisopropanolamine, DIPA), 2-(methylamino)ethanol, 2-(ethylamino)ethanol, 2-(n-butylamino)ethanol, 2-amino-1-butanol (2-AB), 3-amino-1-propanol and 5-amino-1-pentanol, A'3) Alkylenediamines of the formula

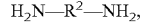
$H_2N-R^2-NH_2$, where $R^2$ is $C_2$-$C_6$-alkylene,
such as hexamethylenediamine, 1,4-diaminobutane, 1,3-diaminopropane, 2,2-dimethyl-1,3-diaminopropane, alkylenediamines of the formula

$R^1-NH-R^2-NH_2$ where $R^1$ is $C_1$-$C_6$-alkyl and $R^2$ is $C_2$-$C_6$-alkylene,
such as 3-methylaminopropylamine,

$(R^1)_2N-R^2-NH_2$ where $R^1$ is $C_1$-$C_6$-alkyl and $R^2$ is $C_2$-$C_6$-alkylene,
3-(dimethylamino)propylamine (DMAPA) and 3-(diethylamino)propylamine, A'4) polyalkylenepolyamines, such as diethylenetriamine, triethylenetetramine and tetraethylenepentamine, A'5) aminoethers such as 2-(2-aminoethoxy)ethanol (AEE), 2-(2-tert-butylaminoethoxy)ethanol (EETB) and 3-methoxypropyldimethylamine When the amine (A) is selected from amines A'1), A'2), A'3), A'4) and A'5), in one embodiment, a suitable aminocarboxylic acid as component (B) is, in particular, an N,N-disubstituted aminocarboxylic acid such as, for example, N-di-$C_1$-$C_4$-alkylamino-carboxylic acids. Examples of preferred N,N-disubstituted aminocarboxylic acids are N,N-dimethylglycine, 3-dimethylaminopropionic acid and dimethylaminoisobutyric acid. Those which are likewise suitable are, in particular, α-amino acids in which the α-carbon atom carries only substituents different from hydrogen, such as, for example, 2-aminoisobutyric acid (2-methylalanine).

When the amine (A) is selected from amines A'1), A'2), A'3), A'4) and A'5), in another embodiment, as component (B), an N-unsubstituted aminocarboxylic acid, N-monosubstituted aminocarboxylic acid, N-unsubstituted aminosulfonic acid and/or N-monosubstituted aminosulfonic acid are suitable. Such absorption media have a particularly rapid $CO_2$ mass transfer. They can be preferred for applications in which the gas to be treated has a very low $CO_2$ partial pressure and/or $CO_2$ removal down to very low residual concentrations is sought.

The amines are used in the form of their aqueous solutions. The absorption medium can in addition comprise physical solvents which, for example, are selected from cyclotetramethylenesulfone (sulfolane) and derivatives thereof, aliphatic acid amides (acetylmorpholine, N-formylmorpholine), N-alkylated pyrrolidones and corresponding piperidones, such as N-methylpyrrolidone (NMP), propylene carbonate, methanol, dialkyl ethers of polyethylene glycols and mixtures thereof.

The absorption medium can comprise further functional components such as stabilizers, in particular antioxidants, see, for example, DE 102004011427, or corrosion inhibitors.

In the process of the invention, in addition to carbon dioxide, customarily other acid gases, such as, for example, $H_2S$, $SO_2$, $CS_2$, HCN, COS, $NO_2$, HCl, disulfides or mercaptans, are also removed from the gas stream if present.

The process or absorption medium of the invention is suitable for treating fluids, in particular gas streams of all types. Fluids which comprise the acid gases are firstly gases, such as natural gas, synthesis gas, coke furnace gas, coal gasification gas, recirculated gas, landfill gases and combustion gases, and secondly liquids which are essentially immiscible with the absorption medium, such as LPG (liquefied petroleum gas) or NGL (natural gas liquids). The process or absorption medium according to the invention is suitable for treatment of hydrocarboneous fluid streams. The hydrocarbons present are, for example, aliphatic hydrocarbons, such as $C_1$-$C_4$-hydrocarbons, such as methane, or aromatic hydrocarbons, such as benzene, toluene or xylene.

The gas stream can be a gas stream which is formed in the following manner:
a) oxidation of organic substances, for example flue gases,
b) composting and storage of waste materials comprising organic substances,
or
c) bacterial decomposition of organic substances.

The oxidation can be carried out with appearance of flames, i.e., as conventional combustion, or as oxidation without appearance of flames, for example in the form of catalytic oxidation or partial oxidation. Organic substances which are subjected to combustion are customarily fossil fuels such as coal, natural gas, petroleum, gasoline, diesel, raffinates or kerosene, biodiesel or waste materials having a content of organic substances. Starting materials of the catalytic (partial) oxidation are, for example, methanol or methane which can be reacted to give formic acid or formaldehyde.

Waste materials which are subjected to oxidation, composting or storage are typically domestic refuse, plastic wastes or packaging refuse.

Combustion of the organic substances usually proceeds in customary combustion plants with air. Composting and storage of waste materials comprising organic substances generally proceeds on refuse landfills. The exhaust gas or the exhaust air of such plants can advantageously be treated by the process according to the invention.

As organic substances for bacterial decomposition, use is customarily made of stable manure, straw, liquid manure, sewage sludge, fermentation residues and the like. Bacterial decomposition proceeds, for example, in conventional biogas plants. The exhaust air of such plants can advantageously be treated by the process according to the invention.

The process is also suitable for treating the exhaust gases of fuel cells or chemical synthesis plants which make use of a (partial) oxidation of organic substances.

In addition, the process of the invention can, of course, also be used for treating unburnt fossil gases, such as natural gas, for example what are termed coal seam gases, that is gases which occur in the extraction of coal, which are collected and compressed.

Generally, these gas streams under standard conditions comprise less than 50 mg/m$^3$ of sulfur dioxide.

Devices suitable for carrying out the process of the invention comprise at least one scrubbing column, for example packed beds, ordered packing columns and tray columns and/or other absorbers such as membrane contactors, radial stream scrubbers, jet scrubbers, Venturi scrubbers and rotary spray scrubbers. The gas stream is treated with the absorption medium in this case preferably in a scrubbing column in countercurrent flow. The gas stream in this case is generally fed into the lower region of the column and the absorption medium into the upper region of the column.

Suitable equipment for carrying out the process of the invention is also scrubbing columns made of plastic, such as polyolefins or polytetrafluoroethylene, or scrubbing columns, the inner surface of which is wholly or partly lined with plastic or rubber. In addition, membrane contactors having a plastic housing are suitable.

The temperature of the absorption medium is generally, in the absorption step, about 30 to 100° C., when a column is used, for example 30 to 70° C. at the top of the column, and 40 to 100° C. at the bottom of the column. A product gas which is low in acid gas components, i.e., a product gas (by-gas) depleted in these components, and an absorption medium loaded with acid gas components are obtained.

Generally, the loaded absorption medium is regenerated by
a) heating, for example to 70 to 110° C.,
b) expansion, or
c) stripping with an inert fluid,
or a combination of two or all of these measures.

Generally, the loaded absorption medium is heated for regeneration and the carbon dioxide liberated is separated off, for example, in a desorption column. Before the regenerated absorption medium is reintroduced into the absorber, it is cooled to a suitable absorption temperature. In order to utilize the energy present in the hot regenerated absorption medium, it is preferred to preheat the loaded absorption medium from the absorber by heat exchange with the hot regenerated absorption medium. By means of the heat exchange, the loaded absorption medium is brought to a higher temperature, so that in the regeneration step a lower energy usage is required. By means of the heat exchange, also, already partial regeneration of the loaded absorption medium can proceed with liberation of carbon dioxide. The resultant gas-liquid mixed phase stream is passed into a phase separation vessel from which the carbon dioxide is taken off; the liquid phase, for complete regeneration of the absorption medium, is passed into the desorption column.

Frequently, the carbon dioxide liberated in the desorption column is subsequently compressed and fed, for example, to a pressure tank or sequestration. In these cases it can be advantageous to carry out the regeneration of the absorption medium at an elevated pressure, for example 2 to 10 bar, preferably 2.5 to 7 bar. The loaded absorption medium for this is compressed by means of a pump to the regeneration pressure and introduced into the desorption column. The carbon dioxide occurs in this manner at a higher pressure level. The pressure difference to the pressure level of the pressure tank is less and under some circumstances a compression stage can be saved. A higher pressure in the regeneration necessitates a higher regeneration temperature. At a higher regeneration temperature, a lower residual loading of the absorption medium can be achieved. The regeneration temperature is generally only restricted by the thermal stability of the absorption medium.

If the gas to be treated is a flue gas, this is, before the absorption medium treatment of the invention, preferably subjected to a scrubbing with an aqueous liquid, in particular with water, in order to cool and moisten (quench) the flue gas. In the scrubbing, dusts or gaseous impurities such as sulfur dioxide can also be removed.

The invention will be described in more detail with reference to the accompanying figures.

Figure 1:
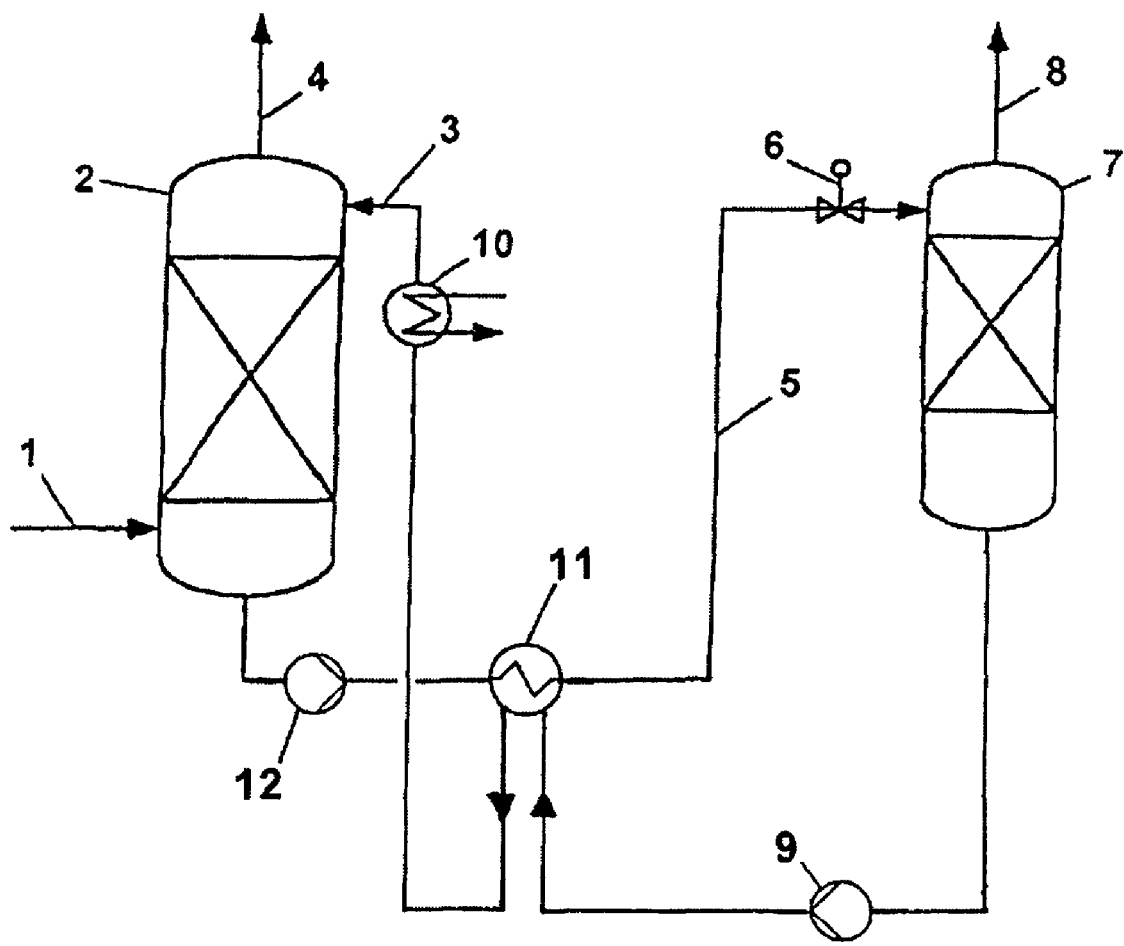
FIG. 1 is a diagrammatic representation of a plant suitable for carrying out the process of the invention, which is suitable, for example, for flue gas treatment.

According to FIG. 1, a suitably pretreated carbon dioxide-comprising gas is brought into contact in countercurrent flow via a line 1 in an absorber 2 with the regenerated absorption medium which is fed via the absorption medium line 3. The absorption medium removes carbon dioxide from the gas by absorption; in this process a pure gas low in carbon dioxide is produced via an offgas line 4. The absorber 2 can have, above the absorption medium inlet, backwash trays or backwash sections (which are not shown) which are preferably equipped with ordered packings, where, using water or condensate, entrained absorption medium is separated off from the $CO_2$-depleted gas. The liquid on the backwash trays can be suitably recycled via an external cooler.

Via an absorption medium line 5, a pump 12, a solvent-solvent heat exchanger 11, in which the acid gas-loaded absorption medium is heated with the heat of the regenerated absorption medium exiting from the bottom of the desorption column 7, and a throttle valve 6, the carbon dioxide-loaded absorption medium is passed to a desorption column 7. In the lower part of the desorption column 7, the loaded absorption medium is heated by means of a heater (which is not shown) and regenerated. The carbon dioxide liberated in the process leaves the desorption column 7 via the offgas line 8. The desorption column 7 can have, above the absorption medium inlet, backwash trays or backwash sections (which are not shown) which are preferably equipped with ordered packings, where using water or condensate, entrained absorption medium is separated off from the liberated $CO_2$. In the line 8, a heat exchanger having a head distributor or condenser can be provided. The regenerated absorption medium is subsequently fed by means of a pump 9 via the solvent-solvent heat exchanger 11, in which the regenerated absorption medium heats the acid gas-loaded absorption medium and is itself cooled in the process, and via a heat exchanger 10 is fed back to the absorption column 2. In order to avoid accumulation of absorbed substances which are not expelled, or are expelled only incompletely, in the regeneration, or of decomposition products in the absorption medium, a substream of the absorption medium taken off from the desorption column 7 can be fed to an evaporator in which low-volatility byproducts and decomposition products occur as residue and the pure absorption medium is taken off as vapors. The condensed vapors are fed back to the absorption medium circuit. Expediently, a base, such as potassium hydroxide, can be added to the substream, which base forms, for example with sulfate or chloride ions, low-volatility salts which, together with the evaporator residue, are taken off from the system.

Figure 2:
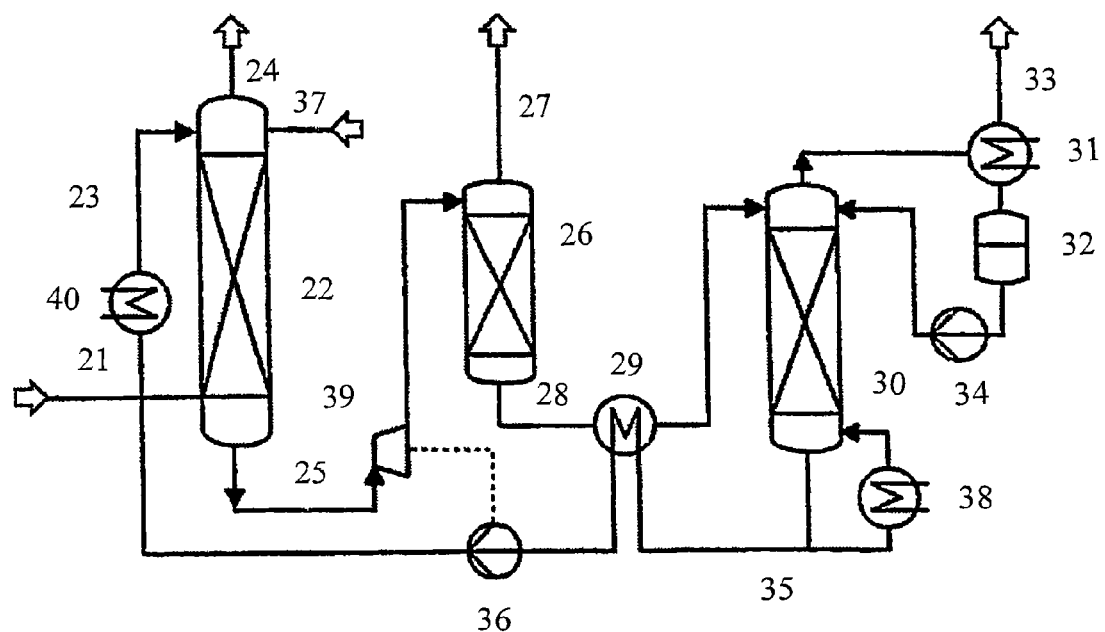
FIG. 2 shows diagrammatically a device for carrying out the process of the invention having an expansion stage and a desorption stage, as is suitable for the treatment of natural gas of the invention.

According to FIG. 2, the feed gas is fed into the lower region of the absorber 22 via line 21. The absorption medium is applied via the line 23 to the top of the absorber 22 in countercurrent flow to the feed gas. The gas depleted in acid gases leaves the absorber 22 overhead (line 24). The absorption medium enriched with acid gases leaves the absorber 22 at the bottom via line 25 and is introduced via an expansion turbine 39 into the upper region of the high-pressure expansion column 26 which is generally operated at a pressure which is above the $CO_2$ partial pressure of the raw gas fed to the absorber. In the expansion, the majority of the dissolved non-acid gases and also a small part of the acid gases are liberated. These gases are ejected from the high-pressure expansion column 26 overhead via line 27. The energy occurring in the expansion turbine 39 can be used to operate the pump 36.

The absorption medium which is still loaded with the majority of the acid gases leaves the high-pressure expansion column via line 28 and is heated in heat exchanger 29 by indirect heat exchange with regenerated absorption medium which is introduced via line 35.

The heated loaded absorption medium is introduced into the upper region of a desorber column 30. Column 30 has indirect bottom heating via heat exchanger 38. In the column 30, a part of the $CO_2$ and $H_2S$ is liberated by flashing, the remainder is virtually completely expelled by stripping in the lower part of the column 30. At the top of the column 30 a reflux cooler 31 together with a collection vessel 32 is provided in order to cool the liberated acid gases and to condense a part of the vapor. The majority of the acid gas leaves the reflux cooler 31 via line 33. The condensate is pumped back to the top of the column 30 by means of pump 34. The regenerated absorption medium leaves the column 30 at the bottom via line 35 and via the heat exchanger 29 is applied to the top of the absorber 22 by means of pump 36 via line 23. Via line 37, fresh water can be fed in to make up for the water discharged together with the gases.

EXAMPLE

$CO_2$-uptake Capacity and Regeneration Energy Requirement

The results shown hereinafter are based on equilibrium measurements at 40° C. and 120° C. of the following systems:
$CO_2$/N,N-dimethylglycine/MEA (monoethanolamine)/water
$CO_2$/2-methylalanine (α-aminoisobutyric acid)/MEA/water These measurements were carried out as follows:

A defined amount of the amine-water mixture or amine-amino acid-water mixture was charged into a glass pressure vessel (volume=110 cm³ or 230 cm³), evacuated and, at constant temperature, carbon dioxide was added stepwise via a defined gas volume. The dissolved carbon dioxide mass in the liquid phase was calculated after correction for gas space in the gas phase.

The equilibrium data for the system $CO_2$/MEA/water were calculated using the electrolyte-NRTL approach according to Chen et al. (Chen C. C., Evans, L. B., A Local Composition Model for the Excess Gibbs Energy of aqueous electrolyte solutions AICHE J., 1986, 32(3), 444-454; the parameters were matched to measurement data).

Based on the equilibrium data, an analysis was carried out for the systems in order to determine the capacity of the various solvent mixtures for the uptake of $CO_2$ and be able to give the trend of energy consumption in the regeneration of the solvents in a stripping column.

In this case the following procedure was followed:

For all solvent mixtures it was assumed that they are used in an absorber which is charged at a total pressure of 1 bar with a $CO_2$-comprising flue gas of 0.13 bar $CO_2$ partial pressure (=13% $CO_2$ content). For the estimation it was assumed that in the absorber bottom the temperature is 40° C. In the regeneration, in the desorber bottom about 120° C. prevails. For estimating the capacity, it is assumed that in the absorber bottom equilibrium is achieved, that is to say the equilibrium partial pressure is equal to the feed gas partial pressure of 13 kPa. The desorption is customarily operated at about 200 kPa. At 120° C., pure water has a partial pressure of about 198 kPa. In an amine solution, the partial pressure of water is somewhat lower, therefore here a $CO_2$ partial pressure of 5 kPa is assumed in the desorber bottom. Here also, reaching equilibrium is assumed as an approximation. The capacity of the various solvents was thus determined
a) from the loading in mole of $CO_2$ per kg of solution at the intersection of the 40° equilibrium curve with the line of constant feed gas $CO_2$ partial pressure 13 kPa (loaded solution at the absorber bottom in equilibrium) and
b) from the intersection of the 120° equilibrium curve with the line of constant $CO_2$ partial pressure of 5 kPa (regenerated solution at the desorber bottom in equilibrium).

The difference of the two loadings is the circuit capacity of the respective solvent. A high capacity means that less solvent needs to be circulated and thus the apparatuses such as, for example, pumps, heat exchangers and also the piping, can be dimensioned smaller. In addition, the circulation rate also affects the energy necessary for the regeneration.

A further measure of this is the slope of the working lines of the stripping column. This is proportional to the ratio of amount of liquid L to amount of gas G in the desorber, L/G. This working line, in the bottom of the desorber, is generally very close to the equilibrium line, so that to a first approximation the slope of the equilibrium curve can be equated with the slope of the working line. Since at the bottom of the desorber most of the $CO_2$ has already been stripped out, the amount of gas corresponds to the amount of steam required for stripping the solution, which steam must be generated in the evaporator. At a constant liquid loading, for a solvent having a high slope of the equilibrium curve, a lower amount of required stripping steam follows. The energy for generating the stripping steam is the important energy of the $CO_2$ absorption process. For a first estimation, the slope of the equilibrium curve in the stripper bottom, however, is meaningful for relative comparisons of solvents.

More suitable than the slope is the reciprocal slope, since it is directly proportional to the amount of steam required per kilogram of solvent. If this reciprocal slope is divided by the capacity of the solvent, this gives a comparative value which directly enables a relative statement of the amount of steam required per amount of $CO_2$ absorbed. These values are shown normalized in table 1.

In table 1, the values are normalized to the value of the MEA mixture. It can be seen that for the absorption media of the invention, the steam requirement is less at a comparable capacity (based on an equivalent MEA solution).

TABLE 1

| Absorption medium | Relative capacity [%] | Relative amount of required steam [%] |
|---|---|---|
| MEA (26%)/ 2-Methylalanine (11%) | 100 | 66 |
| MEA (24%)/ N,N-Dimethylglycine (20%) | 100 | 56 |
| MEA | 100 | 100 |

The invention claimed is:

1. An absorption medium for removing carbon dioxide from a gas stream, comprising an aqueous solution
   (A) of at least one amine; and
   (B) at least one α-amino acid in which the α-carbon atom only carries substituents different from hydrogen, the absorption medium being essentially free from inorganic basic salts.

2. The absorption medium according to claim 1, comprising:
   (A) 10 to 65% by weight amine or combination of amines; and
   (B) 1 to 40% by weight α-amino acid.

3. The absorption medium according to claim 1, wherein the amine (A) has a boiling point at atmospheric pressure of at least 120° C.

4. The absorption medium according to claim 1, comprising at least one amine (A) which is selected from:
   A1) tertiary amines,
   A2) sterically hindered amines selected from (i) amines having a primary amino group which is bound to a tertiary carbon atom, (ii) amines having a secondary amino group which is bound to a secondary or tertiary carbon atom, and (iii) amines in which a tertiary or quaternary carbon atom is arranged in β position to the amino group.

5. The absorption medium according to claim 4, wherein the tertiary amine has the general formula:

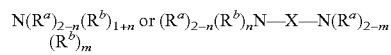

where $R^a$ is an alkyl group, $R^b$ is a hydroxyalkyl group, X is an alkylene group which if appropriate is singly or multiply interrupted by oxygen, and n and m are in each case an integer from 0 to 2.

6. The absorption medium according to claim 4, wherein the tertiary amine is selected from tris(2-hydroxyethyl)amine, tris(2-hydroxypropyl)amine, tributanolamine, bis(2-hydroxyethyl)methylamine, 2-diethylaminoethanol, 2-dimethylaminoethanol, 3-dimethylamino-1-propanol, 3-diethylamino-1-propanol, 2-diisopropylaminoethanol, N,N-bis(2-hydroxypropyl)methylamine (methyldiisopropanolamine, MDIPA), N,N,N',N'-tetra-methylethylenediamine, N,N-diethyl- N',N'-dimethylethylenediamine, N,N,N',N'-tetraethyl -ethylenediamine, N,N,N',N'-tetramethylpropanediamine, N,N,N',N'-tetraethylpropanediamine, N,N-dimethyl-N',N'-diethylethylenediamine and 2-(2-dimethylaminoethoxy)-N,N-dimethylethanamine.

7. The absorption medium according to claim 4, wherein the sterically hindered amine is selected from 2-amino-2-methyl-1-propanol and 1-amino-2-methylpropan-2-ol.

8. The absorption medium according to claim 4, additionally comprising at least one primary or secondary amine as activator.

9. The absorption medium according to claim 8, wherein the activator is selected from:
C1) 5-, 6- or 7-membered saturated heterocycles having at least one NH group in the ring, which can comprise in the ring one or two further heteroatoms selected from nitrogen and oxygen,
C2) primary or secondary alkanolamines,
C3) alkylenediamines of the formula:

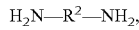

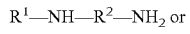

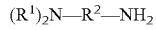

where $R^1$ is $C_1$-$C_6$-alkyl and $R^2$ is $C_2$-$C_6$-alkylene,
C4) polyalkylenepolyamines.

10. The absorption medium according to claim 9, wherein the activator is selected from:
C1) piperazine, 2-methylpiperazine, N-methylpiperazine, N-ethylpiperazine, N-aminoethylpiperazine, homopiperazine, piperidine and morpholine,
C2) 2-aminoethanol, N,N-bis(2-hydroxyethyl)amine, N,N-bis(2-hydroxy-propyl)amine, 2-(methylamino)ethanol, 2-(ethylamino)ethanol, 2-(n-butyl-amino)ethanol, 2-amino-1-butanol, 3-amino-1-propanol and 5-amino-1-pentanol,
C3) hexamethylenediamine, 1,4-diaminobutane, 1,3-diaminopropane, 2,2-dimethyl -1,3-diaminopropane, 3-methylaminopropylamine, 3-(dimethylamino)-propylamine, 3-(diethylamino)propylamine,
C4) diethylenetriamine, triethylenetetramine, tetraethylenepentamine.

11. The absorption medium according to claim 4, wherein the α-amino acid is N-unsubstituted or N-monosubstituted.

12. The absorption medium according to claim 11, wherein the α-amino acid is at least one of 2-aminoisobutyric acid and methylaminoisobutyric acid.

13. An absorption medium for removing carbon dioxide from a gas stream, comprising an aqueous solution of at least one amine (A) which is selected from:

A'1) 5-, 6- or 7-membered saturated heterocycles having at least one NH group in the ring which can comprise in the ring one or two further heteroatoms selected from nitrogen and oxygen,
A'2) primary or secondary alkanolamines,
A'3) alkylenediamines of the formulae:

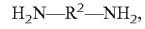

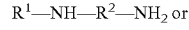

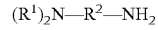

where $R^1$ is $C_1$-$C_6$-alkyl and $R^2$ is $C_2$-$C_6$-alkylene,
A'4) polyalkylenepolyamines,
A'5) aminoethers, and
(B) at least one N,N-disubstituted aminocarboxylic acid.

14. The absorption medium according to claim 13, wherein the amine (A) is selected from:
A'1) piperazine, 2-methylpiperazine, N-methylpiperazine, N-ethylpiperazine, N-aminoethylpiperazine, homopiperazine, piperidine and morpholine,
A'2) 2-aminoethanol, N,N-bis(2-hydroxyethyl)amine, N,N-bis(2-hydroxy-propyl)amine, 2-(methylamino)ethanol, 2-(ethylamino)ethanol, 2-(n-butyl-amino)ethanol, 2-amino-1-butanol, 3-amino-1-propanol and 5-amino-1-pentanol,
A'3) hexamethylenediamine, 1,4-diaminobutane, 1,3-diaminopropane, 2,2-dimethyl -1,3-diaminopropane, 3-methylaminopropylamine, 3-(dimethyl-amino)propylamine, 3-(diethylamino)propylamine,
A'4) diethylenetriamine, triethylenetetramine, tetraethylenepentamine,
A'5) 2-(2-aminoethoxy)ethanol, 2-(2-tert-butylaminoethoxy)ethanol.

15. The absorption medium according to claim 13, wherein the aminocarboxylic acid is N,N-dimethylglycine, 3-dimethylaminopropionic acid and/or dimethylaminoisobutyric acid.

16. A process for removing carbon dioxide from a fluid stream, which comprises bringing the fluid stream into contact with an absorption medium according to claim 1.

17. The process according to claim 16, wherein the loaded absorption medium is regenerated by:
a) heating,
b) expansion,
c) stripping with an inert fluid,
or a combination of two or all of these measures.

18. A process for removing carbon dioxide from a fluid stream, which comprises bringing the fluid stream into contact with an absorption medium according to claim 13.

19. The process according to claim 18, wherein the loaded absorption medium is regenerated by:
a) heating
b) expansion
c) striping with an inert fluid
or a combination of two or all three of a) through c).

* * * * *

UNITED STATES PATENT AND TRADEMARK OFFICE
CERTIFICATE OF CORRECTION

PATENT NO.        : 8,034,166 B2
APPLICATION NO.   : 12/301390
DATED             : October 11, 2011
INVENTOR(S)       : Asprion et al.

Page 1 of 1

It is certified that error appears in the above-identified patent and that said Letters Patent is hereby corrected as shown below:

In claim 5, at column 12, lines 62-63, the following formula:

$$N(R^a)_{2-n}(R^b)_{1+n} \text{ or } (R^a)_{2-n}(R^b)_n N-X-N(R^a)_{2-m}(R^b)_m$$

should be replaced with:

--$N(R^a)_{2-n}(R^b)_{1+n}$     or     $(R^a)_{2-n}(R^b)_n N-X-N(R^a)_{2-m}(R^b)_m$--

In claim 12, at column 13, line 56, "methylaminoisobutyric" should be replaced with --N-methylaminoisobutyric--

Signed and Sealed this
Twenty-seventh Day of March, 2012

David J. Kappos
*Director of the United States Patent and Trademark Office*